INVENTORS
LOWERY K. JONES, JR. &
JAMES D. TURNER
BY Louis A. Fline
Albert L. Sessler Jr.
THEIR ATTORNEYS

INVENTORS
LOWERY K. JONES, JR. &
JAMES D. TURNER

BY Louis A. Kline
Albert L. Sessler, Jr.
THEIR ATTORNEYS

INVENTORS
LOWERY K. JONES, JR. &
JAMES D. TURNER

BY Louis A. Kline
Albert L. Sessler, Jr.
THEIR ATTORNEYS

United States Patent Office 3,375,497
Patented Mar. 26, 1968

3,375,497
MATRIX CONTROL CIRCUITRY USING GATE CONTROLLED UNIDIRECTIONAL SIGNALLING DEVICES

Lowery K. Jones, Jr., and James D. Turner, Dayton, Ohio, assignors to The National Cash Register Company, Dayton, Ohio, a corporation of Maryland
Filed Apr. 27, 1964, Ser. No. 362,854
6 Claims. (Cl. 340—166)

ABSTRACT OF THE DISCLOSURE

An apparatus for energizing selected ones of a plurality of solenoids arranged in a matrix formation. Energization of a selected solenoid is controlled by two coordinate groups of switching circuits, with one switching circuit in each group being operated to complete an energizing path for a selected solenoid. Each switching circuit includes a unidirectional signal translating device, such as a silicon controlled rectifier, which may be rendered conducting by means of a selection circuit, one of which is provided for each coordinate group of switching circuits. Each switching circuit is subsequently rendered non-conducting by a reset circuit to terminate energization of the selected solenoid.

This invention relates generally to switching means. More particularly, the invention relates to switching means which may be employed in combination with one or more selected elements, such as solenoids, for operating or energizing such elements, and also relates to arrangements utilizing said switching means.

In one aspect of the present invention, a plurality of elements, such as solenoids, are disposed in a matrix formation, and a particular element or solenoid of the matrix may be selected for operation or energization by the selection of one switching means in each of two coordinate groups associated with the matrix. The selection of the switching means is accomplished by two selection means, one associated with each of the two coordinate groups of switching means, which cause the two selected switching means to commence conducting an operating or energizing current. When the desired function has been accomplished by the operated element or solenoid, a pair of reset means, one of which is associated with each group of switching means, is utilized to terminate the operation or energization of the selected element or solenoid, by terminating conduction through the switching means.

The switching means of the present invention employs a unidirectional signal translating device having an anode, a cathode, and a control gate. Initiation of conduction of this signal translating device, through the anode and cathode thereof, is controlled by application of a signal to the control gate, over a branch circuit. Termination of conduction of the signal translating device is caused by operation of a separate reset circuit to reverse-bias the signal translating device for a short period of time. One type of component which can be used as the unidirectional signal translating device is a silicon controlled rectifier, although other types of components could also be used, such as, for example, a thyratron or a gate turn-off switch. It should be noted that while the novel switching means is shown herein as being employed in a solenoid matrix, its use is not limited to such an application, since it is capable of use in many other areas wherein "on-off" switching means have utility.

Accordingly, an object of the present invention is to provide an effective, simple, and inexpensive switching means.

Another object is to provide a switching means utilizing a unidirectional signal translating device having an anode, a cathode, and a control gate, said device being rendered conducting by application of an appropriate signal to the control gate, and being rendered non-conducting by operation of a reset circuit to reverse-bias the signal translating device.

An additional object is to provide means for controlling the operation of one or more elements, including switching means for selectively operating the element or elements, selecting means for causing conduction of the switching means, and reset means for terminating conduction of the switching means.

A further object is to provide a solenoid matrix including a plurality of solenoids arranged in rows and ranks and capable of being selectively energized, row switching means associated with each row, row select means to select one of the row switching means, rank switching means associated with each rank, rank select means to select one of the rank switching means, first reset means associated with all of the row switching means to reset a selected row switching means, second reset means associated with all of the rank switching means to reset a selected rank switching means, and reset operating means associated with the first and second reset means for operation thereof, whereby one solenoid in the matrix may be energized by the selection of a desired row and rank of the matrix by the row select means and the rank select means, and whereby said selected solenoid may then subsequently be deenergized by the reset operating means.

With these and incidental objects in view, the invention includes certain novel features of construction and combinations of parts, a preferred form or embodiment of which is hereinafter described with reference to the drawings which accompany and form a part of this specification.

Figure 1:
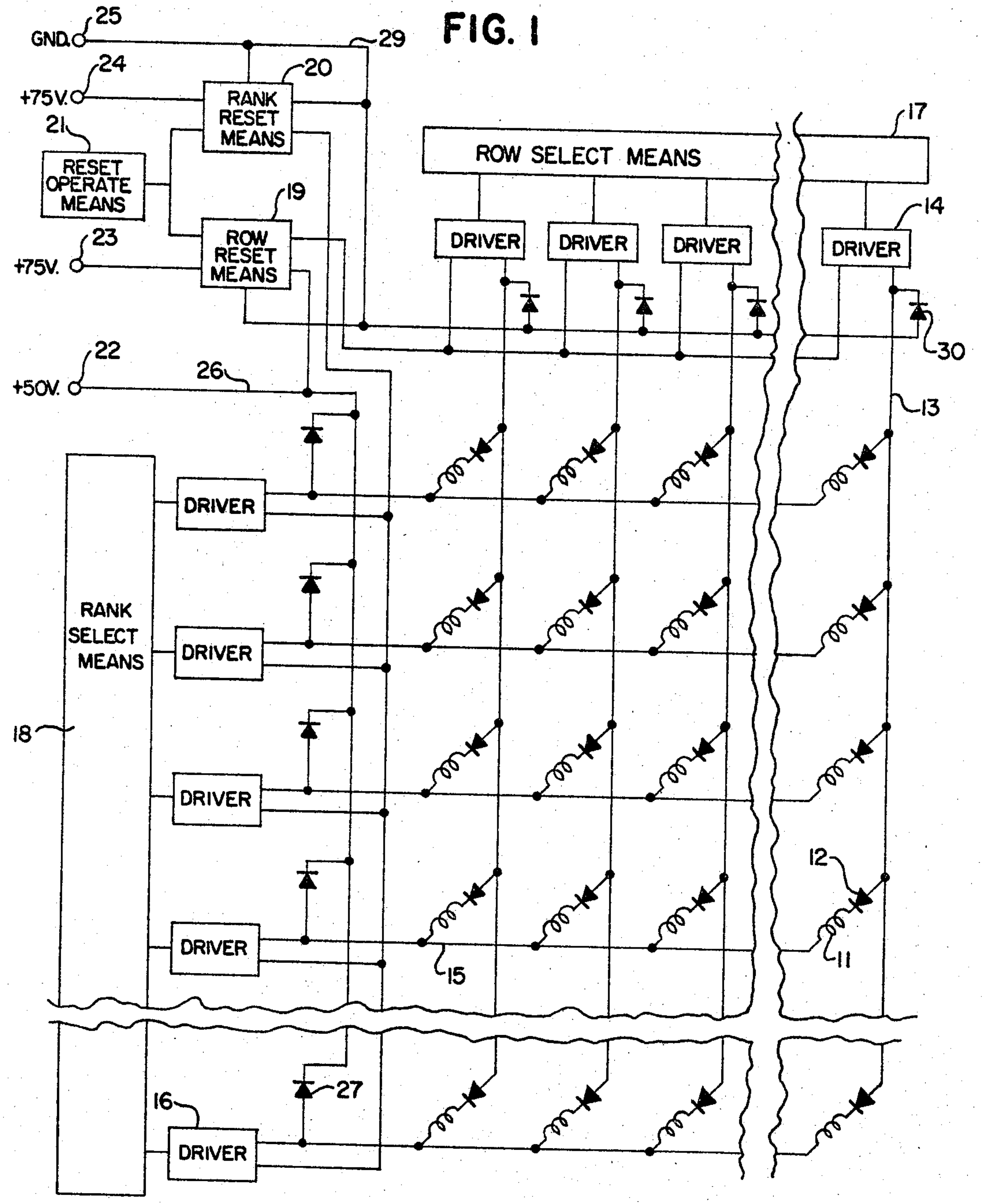
FIG. 1 is a schematic diagram of a solenoid matrix and of the associated elements for operating said matrix.

Referring now to FIG. 1, a plurality of solenoids 11 are shown there, arranged in a matrix formation. As will be seen from the broken-away portion of the matrix of FIG. 1, the matrix may be of any appropriate size.

In series with each solenoid 11 is an isolating diode 12, which may be of type 1N538, manufactured by International Rectifier Corporation, which serves to prevent undesired "sneak paths" by which solenoids in addition to the selected solenoid might otherwise be energized. Each serial combination of a diode and a solenoid is connected at one end to a row conductor 13, which extends to a row driver 14, and each serial combination of a diode and a solenoid is connected at its other end to a rank conductor 15, which extends to a rank driver 16. The row drivers 14 and the rank drivers 16 are switching devices which control current flow in the row and rank conductors 13 and 15, and are of the same design, which may take the form of the circuit of FIG. 3, which will be subsequently described.

All of the row drivers 14 are in turn connected to a row select means 17, and all of the rank drivers 16 are in turn connected to a rank select means 18. The row select means 17 and the rank select means 18 control selection of a particular row driver and a particular rank driver for each solenoid which is to be energized, by causing the selected row driver and rank driver to commence conducting, thus completing a circuit for energizing the selected solenoid. No specific structure is disclosed herein for these two select means, but any one of several conventional types of structures may be used. For example, the raw and rank select means may be made up of registers, such as binary flip-flop registers of appropriate lengths, with associated binary-to-decimal decoding networks connected to the row and rank drivers, if the matrix is designed for a decimal system. Alternatively, sequential stepping switches may be used to energize lines associated with particular row and rank drivers.

Also shown in FIG. 1 are a row reset means 19, a rank reset means 20, and a reset operating means 21. The row reset means 19 is connected to all of the row drivers 14 and is capable of resetting, to a non-conducting condition, any row driver which has previously been rendered conducting. The rank reset means 20 is connected to all of the rank drivers 16 and is capable of resetting, to a non-conducting condition, any rank driver which has previously been rendered conducting. The row reset means 19 and the rank reset means 20 are identical in circuit configuration, and may take the form of the circuit of FIG. 5, which will be subsequently described.

The reset operating means 21 is connected to both the row reset means 19 and the rank reset means 20, and is capable of controlling both of these reset means to operate simultaneously. No specific structure is disclosed herein for the reset operating means, but it may take the form of a free-running clock having a suitable pulse frequency, or it may take the form of a logical network combining logical terms from various controlling elements to produce a signal to operate the row and rank reset means whenever some particular combination of events takes place, in accordance with the configuration of the logical network.

Operating potential for the circuit of FIG. 1 may be provided by any suitable power supply. In the illustrated embodiment, terminal 22 is connected to a source of plus 50-volt D.C. potential, and terminals 23 and 24 are connected to a source of plus 75-volt D.C. potential. An additional terminal 25 is connected to a base reference potential, shown in FIG. 1 as ground. A conductor 26, connected to the plus 50-volt terminal 22, applies a plus 50-volt potential to the row reset means 19 and, over a diode 27, also applies a plus 50-volt potential to each of the rank drivers 16. The plus 75-volt terminals 23 and 24 are connected to the row reset means 19 and the rank reset means 20, respectively, to apply a plus 75-volt potential thereto.

The grounded terminal 25 is connected over a conductor 29 to the row reset means 19, the rank reset means 20, and, over a diode 30, to each of the row drivers 14.

The matrix formation of solenoids shown in FIG. 1 provides a convenient arrangement whereby a particular solenoid 11 can be energized by selection of a corresponding row driver 14 and rank driver 16 by the row select means 17 and the rank select means 18. The selected row and rank drivers are rendered conducting by their selection, and a circuit for energizing the selected solenoid 11 is completed over a path such as the one shown in FIG. 2, which path extends from the plus 50-volt terminal 22 through the row reset means 19, the selected row driver 14, one of the conductors 13, the diode 12, the selected solenoid 11, one of the conductors 15, the selected rank driver 16, and the rank reset means 20, to the ground terminal 25. The specific manner in which the various drivers and reset means are connected into the energizing circuit, as well as the manner in which they function to provide the desired energization and deenergization of the solenoid 11, will subsequently be described in detail. Suffice it to say for the present that conduction through the selected row and rank drivers 14 and 16 causes energization of the solenoid 11 over the circuit of FIG. 2 described above, and that the subsequent operation of the row and rank reset means 19 and 20 by the reset operating means 21 is effective to terminate conduction of the row and rank drivers 14 and 16, and thus to cause deenergization of the selected solenoid 11.

Figure 3:
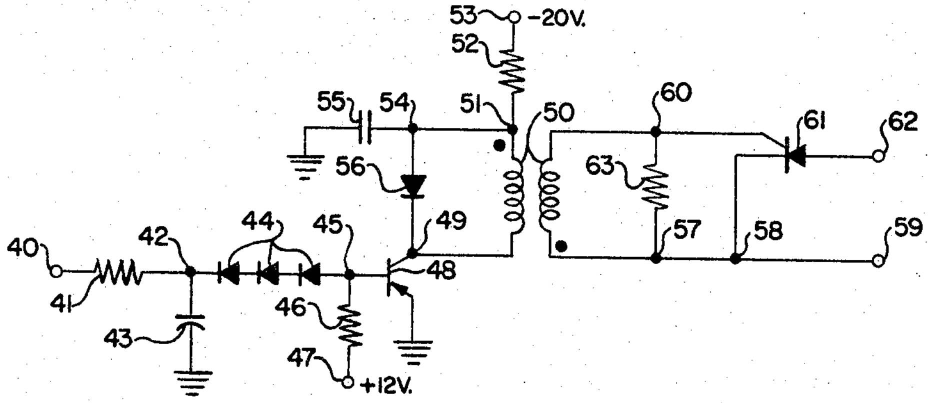
FIG. 3 is a schematic diagram of a switching circuit which may be used in the arrangement shown in FIG. 1.

One use for which a solenoid matrix of the type shown in FIG. 1 is admirably adapted is for automatic or remote operation of the keyboard of a business machine, such as an accounting machine, a cash register, or an input-output device provided as one element of an online data-processing system in which input-output devices are remotely controlled from a central data-processing station. In such an application of the solenoid matrix to the keyboard of a business machine, one solenoid is provided for each key of the keyboard, and energization of the solenoid causes depression of the key. One example of a machine operated in such a manner is found in the copending U.S. patent application Ser. No. 308,382, filed Sept. 12, 1963, inventors George C. Beason and Calvin E. Stichweh, now U.S. Patent No. 3,158,318 issued Nov. 24, 1964. One example of an on-line data-processing system in which such a machine might be used is found in the copending U.S. patent application Ser. No. 335,184, filed Jan. 2, 1964, inventors Robert M. Tink et al., now U.S. Patent No. 3,308,439, issued Mar. 7, 1967. Of course it will be realized that the present invention is not limited to this type of an application, and that the switching means disclosed herein could be used to operate a single solenoid, as well as a plurality of them. In addition, the switching means could, if desired, be utilized to control the operation of elements other than solenoids, such as relays, motors, etc The switching circuit shown in FIG. 3 has been found to be quite suitable for use as a row driver and a rank driver in the solenoid operating circuit of FIG. 1. Input means for the circuit of FIG. 3 are provided for by a terminal 40, which will, if the circuit is used as a driver, be connected to the row select means 17 or to the rank select means 18. The terminal 40 is connected over a 1200-ohm resistor 41 to a point 42 in the driver circuit. A first branch of the circuit from the point 42 extends over a 0.039-microfarad capacitor 43 to a ground connection. A second branch of the circuit extends from the point 42 over three serially-connected diodes 44, which may be of type SG757, manufactured by Transitron Electronic Corporation, to a point 45. The resistor 41, the capacitor 43, and the diodes 44 form a noise-limiting network to prevent spurious noise pulses from triggering the circuit of FIG. 3.

From the point 45, the circuit extends over an 8000-ohm resistor 46 to a terminal 47, to which is applied a plus 12-volt source of D.C. potential. The point 45 is also connected to the base circuit of a signal-translating device 48, which may be a PNP-type transistor of type NCR525, which has the same general characteristics as a transistor of type 2N525 manufactured by General Electric Company. The emitter of said transistor is connected to ground, while the collector of said transistor is connected over a point 49 to one end of the primary of a transformer 50, which may be of the air core type. The other side of the primary of the transformer 50 is connected over a point 51 and a 3900-ohm resistor 52 to a terminal 53, to which is applied a source of minus 20-volt D.C. potential. From the point 51 a circuit branch extends over a point 54 and a 0.047-microfarad capacitor 55 to a ground connection. A diode 56, which may be of type 1N949, manufactured by Transitron Electronic Corporation, is connected between the points 49 and 54, and functions to prevent the transistor 48 from being damaged by an inductive kick from the transformer 50.

The secondary of the transformer 50 is connected at one end over points 57 and 58 to a terminal 59. When the switching circuit of FIG. 3 is used as a row driver, the terminal 59 is connected over one of the conductors 13 to one side of a row of the diodes 12, and to one side of a diode 30, which may be of type 1N538, manufactured by International Rectifier Corporation, the other side of which is connected to ground. When the circuit of FIG. 3 is used as a rank driver, the terminal 59 is connected to the associated rank reset means 20.

The other end of the secondary of the transformer 50 is connected over a point 60 to the control gate of a unidirectional signal translating device 61, shown in FIG. 3 as a silicon controlled rectifier, which may be of type C12A, manufactured by General Electric Company. Other types of unidirectional signal translating devices, such as a thyratron or a gate turn-off switch, may be used in place of the silicon controlled rectifier, if desired. In such case, any necessary modifications of the circuitry would be well within the skill of one versed in the art.

The cathode of the silicon controlled rectifier 61 is connected to the point 58, and its anode is connected to a terminal 62. A 1000-ohm resistor 63 is connected between the points 57 and 60, between the cathode and the control gate of the silicon controlled rectifier 61.

It may be noted that when the switching circuit of FIG. 3 is used as a row driver, the terminal 62 is connected to the associated row reset means 19. When the circuit of FIG. 3 is used as a rank driver, the terminal 62 is connected over one of the conductors 15 to one side of a rank of solenoids 11, and is also connected over said conductor 15 and over a diode 27, which may be of type 1N538, manufactured by International Rectifier Corporation, to the terminal 22, to which a source of plus-50 volt D.C. potential is applied.

The mode of operation of the circuit of FIG. 3 will now be described, with the aid of the wave forms shown in FIG. 4, which represent signals at various points in said circuit, during its operation. It should be noted that the various voltage levels shown in FIG. 4 and described in the specification, as well as the specified values of the various components of the circuit of FIG. 3, are merely illustrative, and could be altered to meet different circuit requirements.

Let it be assumed that the circuit of FIG. 3 is being used as a row driver and initially has a potential of zero volts applied at terminal 40, and a potential of plus 50 volts at terminal 62, which is connected over the row reset means 19 to the terminal 22, with terminal 59 being connected to one of the row conductors 13 of the matrix of FIG. 1. Current flow from the plus 12-volt terminal 47 over the resistor 46, the point 45, the diodes 44, the point 42, and the capacitor 43, to ground, causes the capacitor 43 to charge to plus 2 volts. The potential at the point 45 in the base circuit of the transistor 48 is at approximately plus 3.5 volts, as may be seen in FIG. 4, which is effective to reverse-bias the transistor and prevent its conduction.

With the transistor 48 cut off, there is no current flow through its collector circuit, and the potential at points 49 and 51 is therefore minus 20 volts. The capacitor 55 accordingly charges to minus 20 volts.

The voltage level at the input terminal 40 varies between logical levels of zero volts and minus 8 volts. Let it now be assumed that an input pulse of minus 8 volts, of approximately 55 microseconds duration, is applied to the terminal 40. The capacitor 43 accordingly discharges to a potential of minus 4 volts in approximately 32 microseconds. The minus 4 volts potential at point 42 is sufficient to override the combined voltage drop of the serially-connected diodes 44, and causes the potential at point 45 in the base circuit of the transistor 48 to go to approximately minus 0.2 volt, which is sufficient to cause the transistor to commence conducting. This completes a circuit from ground, through the transistor, emitter to collector, and through the primary of the transformer 50, discharging the capacitor 55.

Figure 4:
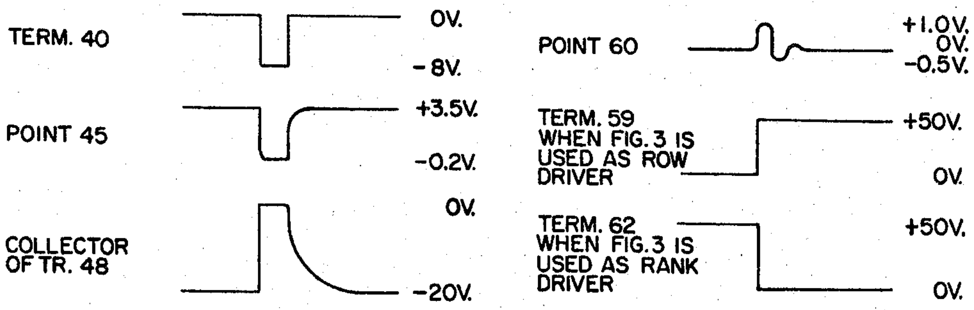
FIG. 4 shows a plurality of wave forms illustrating the signals at various points in the circuit of FIG. 3 during its operation.

A wave form induced by the primary on the secondary of the transformer 50 is applied between the gate and the cathode of the silicon controlled rectifier 61, and is shown in FIG. 4 as it appears at point 60. The positive portion of the wave form, applied to the control gate, is effective to fire the silicon controlled rectifier, causing it to conduct in the forward direction, establishing a conductive path between the terminals 62 and 59. The wave form at terminal 59 is shown in FIG. 4 for the situation in which the circuit of FIG. 3 is used as a row driver, and the wave form at terminal 62 is shown in FIG. 4 for the situation in which the circuit of FIG. 3 is used as a rank driver. It may be noted that when the circuit is used as a row driver, the terminal 62 remains at plus 50 volts potential, and when the circuit of FIG. 3 is used as a rank driver, the terminal 59 remains at zero volts potential.

Once the silicon controlled rectifier 61 has commenced conducting, its gate has no further control over it. To terminate conduction of the rectifier 61, it is reverse-biased, cathode to anode. This is accomplished by the reset circuit of FIG. 5, which will now be described.

Figure 5:
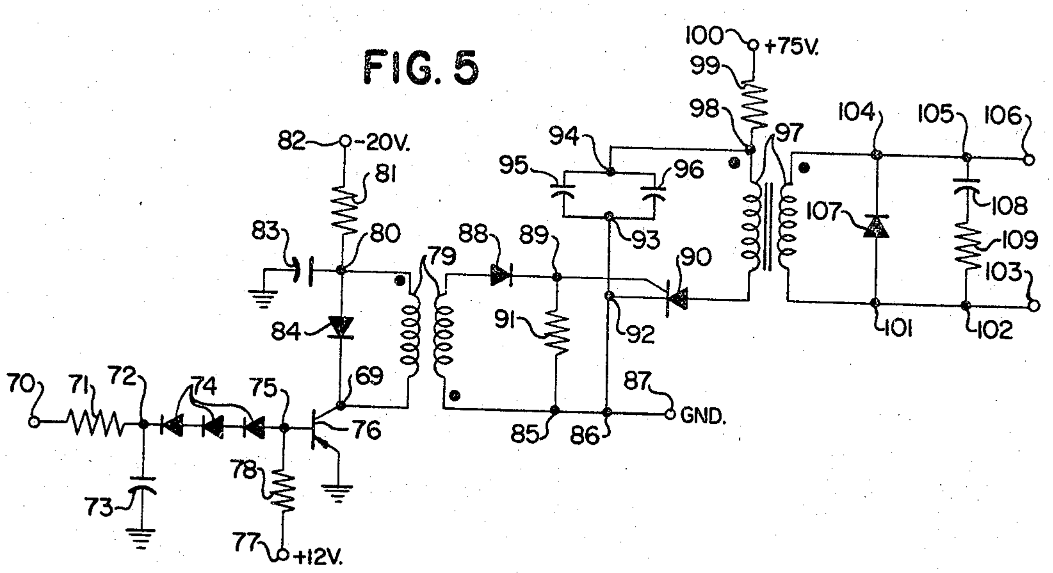
FIG. 5 is a schematic diagram of a reset circuit which may be used with the switching circuit of FIG. 3, particularly in the arrangement shown in FIG. 1.

It will be noted that a considerable portion of the reset circuit of FIG. 5 is practically identical to the circuit of FIG. 3, and therefore the description of that portion of the circuit, and its operation, will be somewhat brief, since reference may be had to the description of the circuit of FIG. 3 for a more complete explanation.

An input signal for the circuit of FIG. 5 is applied to a terminal 70, which is connected over a 1210-ohm resistor 71 to a point 72, from which one circuit branch extends over a 0.039-microfarad capacitor 73 to ground, while a second branch extends over three serially-connected diodes 74, which may be of type SG757, manufactured by Transitron Electronic Corporation, to a point 75 in the base circuit of a PNP-type transistor 76, which may be of type NCR525, which has the same general characteristics as a transistor of type 2N525, manufactured by General Electric Company. A terminal 77, to which a source of plus 12-volt D.C. potential is applied, is connected to the point 75 over an 8060-ohm resistor 78. As was mentioned in the description of FIG. 3, the resistor 71, the capacitor 73, and the diodes 74 form a noise-limiting network to prevent spurious noise pulses from triggering the circuit of FIG. 5.

The emitter of the transistor 76 is connected to ground, while the collector of said transistor is connected over a point 69 to one end of the primary winding of a transformer 79, which may be of the air core type. The other end of the primary winding of the transformer 79 is connected to a point 80. One circuit branch extends from the point 80 over a 3900-ohm resistor 81 to a terminal 82, to which is applied a source of minus 20-volt D.C. potential. A second branch extends from the point 80 over a 0.047-microfarad capacitor 83 to ground. Between the points 69 and 80 is connected a diode 84, which may be of type 1N949, manufactured by Transitron Electric Corporation, and which is provided to prevent damage to the transistor 76 by an inductive kick from the transformer 79.

One end of the secondary winding of the transformer 79 is connected over points 85 and 86 to a terminal 87, to which may be applied a ground connection. The other end of the secondary winding of the transformer 79 is connected over a diode 88, which may be of type DR453, manufactured by Sylvania Electric Products, Incorporated, and a point 89 to the control gate of a silicon controlled rectifier 90, which may be of type C12A, manufactured by General Electric Company. Between the points 85 and 89 is connected at 1000-ohm resistor 91.

The cathode of the silicon controlled rectifier 90 is connected at a point 92 to a conductor extending between the point 86 and a point 93. Between the point 93 and a point 94 are connected in parallel two capacitors 95 and 96, having a capacitance of 10 microfarads each.

The anode of the silicon controlled rectifier 90 is connected to one end of the primary winding of an iron core transformer 97. In the illustrated embodiment, this is a 1:1.76 step-up transformer with no phase inversion. The other end of the primary winding of the transformer 97 is connected to a point 98. One circuit path extends from the point 98 to the previously-mentioned point 94, and a second circuit path extends from the point 98 over a 100-ohm resistor 99 to a terminal 100, to which is applied a source of plus 75-volt D.C. potential.

The secondary winding of the transformer 97 is connected at one end over points 101 and 102 to a terminal 103, and is connected at its other end over points 104 and 105 to a terminal 106. A diode 107, which may be of type 10B6, manufactured by International Rectifier Corporation, is connected between the two points 101 and 104, while a serial combination of a 0.01-microfared capacitor 108 and a 75-ohm resistor 109, provided to cause attenuation of undesired voltage transients at the time the driver turns off, is connected between the points 102 and 105.

When the circuit of FIG. 5 is used as a row reset means, in association with one or more row drivers, the terminal 106 is connected to a plus 50-volt D.C. source of potential, and the terminal 103 is connected over a conductor to the terminal 62 of the circuit of FIG. 3, it being assumed that the circuit of FIG. 3 is being used as a row driver.

Figure 2:
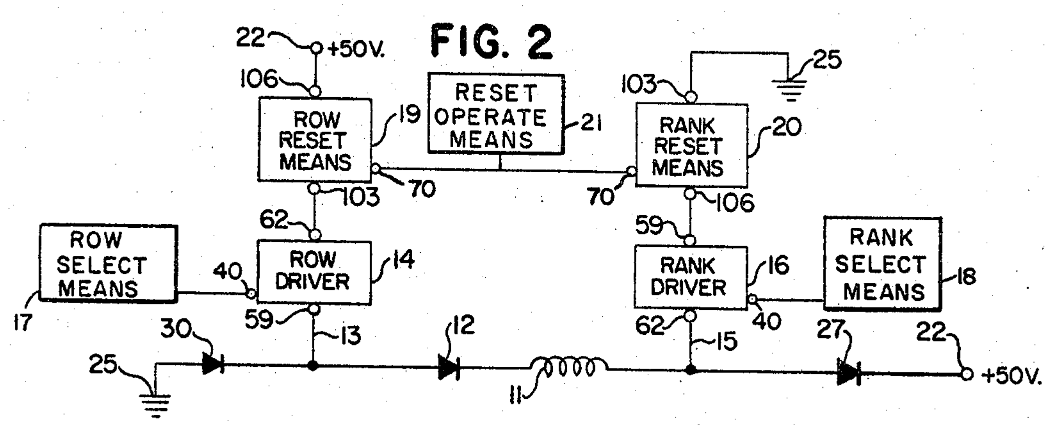
FIG. 2 is a simplified schematic diagram showing a single solenoid and the associated elements for controlling the energization and deenergization of said solenoid.

When the circuit of FIG. 5 is used as a rank reset means in association with one or more rank drivers, the terminal 103 is connected to ground, and the terminal 106 is connected to a conductor which, in turn, is connected to the terminal 59 of the circuit of FIG. 3, it being assumed that the circuit of FIG. 3 is used as a rank driver. The proper orientation of the various reset means and drivers, with respect to each other, in a circuit for energizing a particular solenoid, is shown in FIG. 2, with various terminals designated.

The mode of operation of the circuit of FIG. 5 will now be described, with the aid of the wave forms shown in FIG. 6, which represents signals at various points in said circuit, during its operation. It should be noted that the various signals described in the specification and shown in FIG. 6, as well as the specified values of the various components of the circuit of FIG. 5, are merely illustrative, and could be altered to meet different circuit requirements.

Let it be assumed that the circuit of FIG. 5 is being used as a row reset means, and initially has a potential of zero volts applied at terminal 70, and a potential of plus 50 volts at terminal 106, with terminal 103 being connected to the terminal 62 of one or a plurality of row drivers, said row drivers using the circuit shown in FIG. 3. If one of the row drivers has previously been rendered conducting by an input pulse of minus 8 volts at its terminal 40, then a current path for energizing a solenoid 11 has been established, and extends from the plus 50-volt terminal 22 (FIGS. 1 and 2) over the terminal 106 of FIG. 5, through the low-impedance secondary winding of the transformer 97, over the terminal 103, over a conductor to the terminal 62 of the selected row driver, and thence through the remainder of the energizing circuit as shown in FIGS. 1 and 2.

As has been previously described in connection with the similar circuit of FIG. 3, current flow from the plus 12-volt terminal 77 over the resistor 78, the point 75, the diode 74, the point 72, and the capacitor 73, to ground, causes said capacitor to charge to plus 2 volts. The potential at the point 75 is at approximately plus 3.5 volts, which reverse-biases the transistor 76, and prevents conduction therethrough.

With the transistor 76 cut off, there is no current flow through its collector circuit, and the potential at points

78 and 80 is minus 20 volts, so that the capacitor 83 is charged to minus 20 volts.

When an input pulse of minus 8 volts is applied to the terminal 70 of the circuit of FIG. 5, the capacitor 73 discharges to minus 4 volts, as shown by the wave form for point 72 in FIG. 6, which causes the transistor 76 to commence conducting, as shown by the wave form for point 69, thereby discharging the capacitor 83 through the primary of the transformer 79, in the same manner as described in connection with the circuit of FIG. 3.

This causes a wave form induced by the primary on the secondary of the transformer 79 to be applied between the gate and the cathode of the silicon controlled rectifier 90. This wave form, applied to the control gate of the rectifier 90 over the diode 88 and the point 89, as may be seen in FIG. 6, is effective to cause it to commence conducting in the forward direction.

The storage capacitors 95 and 96 have previously been charged to the level of the plus 75-volt supply. Firing the silicon controlled rectifier 90 discharges the capacitors 95 and 96 into the primary of the transformer 97. This action produces a transient oscillatory effect, and a resulting signal is induced in the secondary winding of the transformer 97. Also, because of the transient oscillatory effect, the silicon controlled rectifier 90 is reverse-biased, by a negative swing of the signal on its anode, as shown in FIG. 6, and the conduction of said rectifier is thereby terminated. The secondary of the transformer 97 is in series with the path conducting D.C. current from the plus 50-volt terminal 22 through the row driver to the selected solenoid 11. Opposing voltage induced in the secondary winding of the transformer 97 as a result of the discharge of capacitors 95 and 96 produces a large counter EMF, which takes the form of a 125-volt negative going spike on the terminal 103, as shown in FIG. 6, and which reverse-biases the previously conducting silicon controlled rectifier 61 of the selected row driver. This causes the silicon controlled rectifier to cease conducting, and thereby interrupts the energizing circuit for the solenoid 11.

Figure 6:
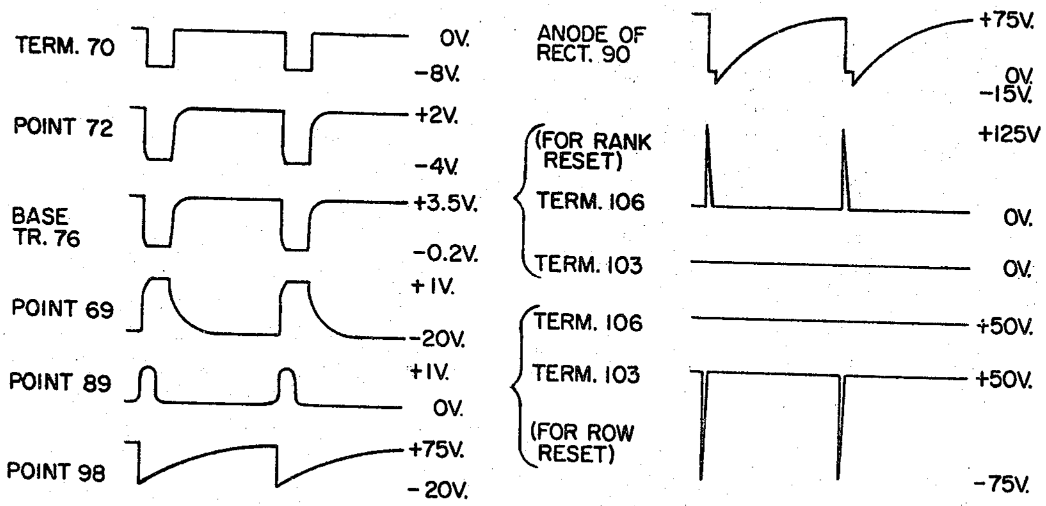
FIG. 6 shows a plurality of wave forms illustrating the signals at various points in the circuit of FIG. 5 during its operation.

In a like manner, the conducting silicon controlled rectifier 61 of the selected rank driver is reverse-biased by a 125-volt positive-going spike on the terminal 106 of its associated rank reset means at the same time, as shown in FIG. 6, and conduction of the silicon controlled rectifier 61 of the selected rank driver is thereby terminated.

The diode 107 is provided in the circuit of FIG. 5 in order to clamp the potential at the anode of the silicon controlled rectifier 61 in the row driver at no more than plus 50 volts, in order to protect said rectifier. If the diode 107 were not included in the circuit, it is possible that the transient oscillatory effect in the circuit of FIG. 5 might result in producing a momentary pulse of greater than plus 50 volts which could exceed the rating of the silicon controlled rectifier 61 and thereby damage it.

If desired, two secondaries may be used with a single primary of the transformer 97, with one secondary being associated with the rank drivers and the other being associated with the row drivers. This would enable the use of a single reset circuit of the type shown in FIG. 5, which would be effective to terminate conduction simultaneously of both the selected row driver and the selected rank driver.

It will be seen from the above description that the circuits of FIGS. 3 and 5 may be combined to provide a simple and effective switching means for controlling conduction through a circuit path, with the circuit of FIG. 3 providing means to initiate conduction through the unidirectional signal translating device 61, and the circuit of FIG. 5 providing means to terminate the conduction through said device.

While the form of device shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A solenoid matrix comprising, in combination, a plurality of solenoids arranged in rows and ranks and capable of being individually selectively energized;

a row switching means associated with each row and including a unidirectional signal translating device having an anode, a cathode, and a control gate connected so that a solenoid energizing circuit extends through the anode and cathode thereof, which device may be selectively rendered conducting or non-conducting to establish or interrupt an energizing path for energizing a selected solenoid of the matrix;

row select means associated with the control gate of the unidirectional signal translating device of each row switching means to selectively render conducting the unidirectional signal translating device of the row switching means for the selected row;

a rank switching means associated with each rank and including a unidirectional signal translating device having an anode, a cathode, and a control gate connected so that a solenoid energizing circuit extends through the anode and cathode thereof, which device may be selectively rendered conducting or non-conducting to establish or interrupt an energizing path for energizing a selected solenoid of the matrix;

rank select means associated with the control gate of the unidirectional signal translating device of each rank switching means to selectively render conducting the unidirectional signal translating device of the rank switching means for the selected rank;

first reset means associated with all of the row switching means and including output means, an oscillating circuit for establishing a signal on the output means, a unidirectional signal translating device having an anode and a cathode connected to the oscillating circuit and also having a control gate, and input means connected to the control gate for controlling conduction of the unidirectional signal translating device, said first reset means being capable of terminating conduction of the unidirectional signal translating device of any row switching means;

second reset means associated with all of the rank switching means and including output means, an oscillating circuit for establishing a signal on the output means, a unidirectional signal translating device having an anode and a cathode connected to the oscillating circuit and also having a control gate, and input means connected to the control gate for controlling conduction of the unidirectional signal translating device, said second reset means being capable of terminating conduction of the unidirectional signal translating device of any rank switching means; and reset operating means associated with the input means of the first and second reset means, and capable of operating said unidirectional signal translating devices of said first and second reset means to cause termination of conduction of the unidirectional signal translating devices of the previously selected row switching means and rank switching means, whereby one solenoid in the matrix may be energized by selection of a desired row and rank of the matrix by the row select means and the rank select means, and whereby said selected solenoid may then subsequently be deenergized by the reset operating means.

2. The solenoid matrix of claim 1, in which the unidirectional signal translating devices are silicon controlled rectifiers.

3. A solenoid matrix comprising, in combination, a plurality of solenoids arranged in rows and ranks and capable of being individually selectively energized;

a row switching means associated with each row and including a unidirectional signal translating device having an anode, a cathode, and a control gate connected so that a solenoid energizing circuit extends through the anode and cathode thereof;

row select means associated with the control gate of the unidirectional signal translating device of each row switching means to selectively operate the unidirectional signal translating device of one of said row switching means;

a rank switching means associated with each rank and including a unidirectional signal translating device having an anode, a cathode, and a control gate connected so that a solenoid energizing circuit extends through the anode and cathode thereof;

rank select means associated with the control gate of the unidirectional signal translating device of each rank switching means to selectively operate the unidirectional signal translating device of one of said rank switching means;

first reset means associated with the unidirectional signal translating devices of all of the row switching means and capable of resetting the unidiretcional signal translating device of any row switching means which is operated;

second reset means associated with the unidirectional signal translating devices of all of the rank switching means and capable of resetting the unidirectional signal translating device of any rank switching means which is operated; and reset operating means capable of operating the first and second reset means to cause resetting of the unidirectional signal translating device of any operated row switching means and any operated rank switching means, whereby one solenoid in the matrix may be energized by selection of a row and rank of the matrix by the row select means and the rank select means, and whereby said select solenoid may then subsequently be deenergized by the reset operating means.

4. The solenoid matrix of claim 3 in which the unidirectional signal translating devices are silicon controlled rectifiers.

5. A switching device for controlling elements arranged in rows and ranks in a matrix comprising, in combination, a row switching means associated with each row of the matrix and including a unidirectional signal translating device having an anode, a cathode, and a control gate connected so that an element controlling circuit extends through the anode and cathode thereof;

row select means associated with the control gate of the unidirectional signal translating device of each row switching means to selectively operate the unidirectional signal translating device of one of said row switching means;

a rank switching means associated with each rank of the matrix and including a unidirectional signal translating device having an anode, a cathode, and a control gate connected so that an element controlling circuit extends through the anode and cathode thereof;

rank select means associated with the control gate of the unidirectional signal trnaslating device of each rank switching means to selectively operate the unidirectional signal translating device of one of said rank switching means;

first reset means associated with the unidirectional signal translating devices of all of the row switching means and capable of resetting any row switching means which is operated;

second reset means associated with the unidirectional signal translating devices of all of the rank switching means and capable of resetting any rank switching means which is operated; and reset operating means capable of operating the first and second reset means to cause resetting of the unidirectional signal translating device of any operated row switching means and any operated rank switching means, whereby one of the elements of the matrix may be controlled by selection of a row and rank of the matrix by the row select means and the rank select means, and whereby the control of said selected element may subsequently be terminated by resetting of the row and rank switching means by the first and second reset means under control of the reset operating means.

6. The switching device of claim 5 in which the unidirectional signal translating devices are silicon controlled rectifiers.

References Cited

UNITED STATES PATENTS

| | | | |
|---|---|---|---|
| 2,889,508 | 6/1959 | McCoy et al. | 340—166 |
| 2,964,657 | 12/1960 | Page | 340—166 X |
| 2,992,410 | 7/1961 | Groth et al. | 340—166 |
| 3,129,408 | 4/1964 | Hechler | 340—166 |
| 3,286,234 | 11/1966 | Hogrefe | 340—166 |
| 3,280,267 | 10/1966 | Feucht | 340—166 |

JOHN W. CALDWELL, *Primary Examiner.*

NEIL C. READ, *Examiner.*

H. I. PITTS, *Assistant Examiner.*